(No Model.)

T. EUPHRAT.
TROLLEY FOR ELECTRIC RAILWAYS.

No. 540,486. Patented June 4, 1895.

Witnesses.
W. J. Morgan
S. H. Morgan

Inventor.
Th. Euphrat
By A. P. Thayer
atty

UNITED STATES PATENT OFFICE.

THEOPHILE EUPHRAT, OF DARIEN, CONNECTICUT.

TROLLEY FOR ELECTRIC RAILWAYS.

SPECIFICATION forming part of Letters Patent No. 540,486, dated June 4, 1895.

Application filed March 5, 1895. Serial No. 540,594. (No model.)

*To all whom it may concern:*

Be it known that I, THEOPHILE EUPHRAT, a citizen of the United States, and a resident of Darien, in the county of Fairfield and State of Connecticut, have invented certain new and useful Improvements in Trolleys for Electric Railways, of which the following is a specification.

My invention relates to means of lubricating trolley wheels and to mounting them for readily substituting one for another, as when it is desirable to substitute an ice or sleet detaching wheel for the ordinary wheel, as hereinafter fully described reference being made to the accompanying drawings, in which—

Figure 1:
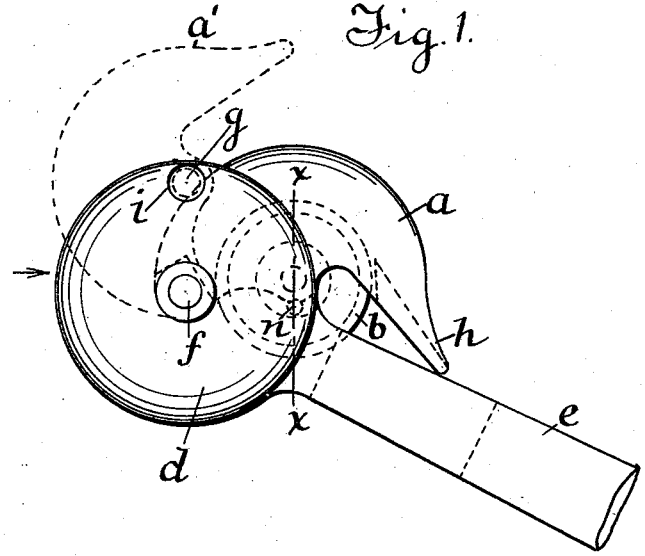
Figure 2:
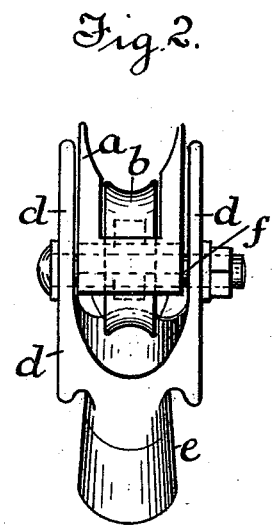
Figures 3, 5:
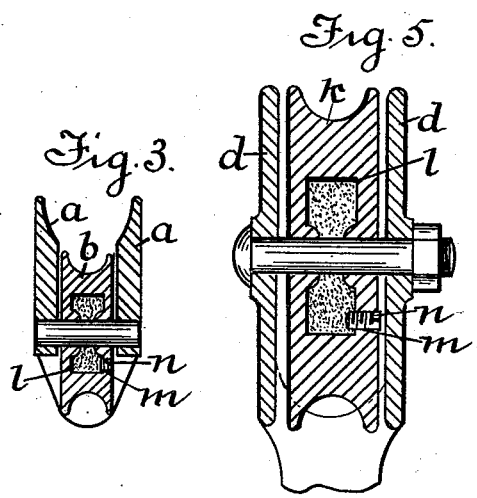
Figure 4:
Figure 6:
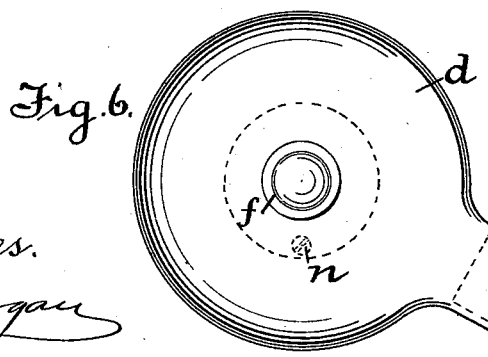

Figure 1 is a side elevation of a trolley-wheel mounted in the fork of a pole and adapted for substituting another according to my invention. Fig. 2 is a rear elevation of the same as seen in the direction indicated by the arrow at the left hand of Fig. 1. Fig. 3 is a sectional elevation of the wheel and its housing on line $x$ $x$, Fig. 1. Fig. 4 is a front elevation of a fluted or ice-detaching wheel substituted in the housing. Fig. 5 is a sectional elevation of an ordinary trolley-wheel and the fork of the pole in which it is mounted, the wheel being adapted for lubrication according to my invention. Fig. 6 is a side elevation of the wheel and fork of Fig. 5.

The full lines $a$, and the dotted lines $b$, in Fig. 1, and $a$, in Figs. 2, 3 and 4 indicate a housing in which I mount the wheel $b$, for ordinary work, or the wheel $c$, for detaching ice, as well as for the contact wheel, and I pivot the housing $a$, in the fork $d$ of the trolley pole $e$, at the center $f$, where the ordinary trolley wheel is pivoted, and pivot the wheel at $g$ in the housing. The housing is adapted to be turned up or down on the pivot $f$, as indicated by the dotted lines $a'$ and it has a beak $h$, which rests on the pole $e$, when in the normal position. The pivot $g$ for the wheels $b$—$c$ is fitted to drive in and out of the housing $a$, readily for changing the wheels, the wheels being fitted to turn on it freely, and is confined by the cheeks of the fork $d$, when in the working position against shifting out of place. For changing the wheels the housing $a$ is turned up on its pivot $f$ to bring pivot $g$ to a place where its removal will not be obstructed by the cheeks of the jaws as to the perforations $i$, or it may be notches or depressions in the cheeks.

For lubrication of the trolley wheels whether such as $b$—$c$, or the ordinary wheel $k$, I provide an internal chamber $l$ surrounding the axial bore and open thereto, with a filling orifice as $m$, communicating with it from the exterior of the wheel and provided with a plug $n$ to close it, and I charge the said chamber with melted grease that will harden at ordinary temperature by pouring it through the filling orifice, and then closing the orifice with the plug. When the bearing runs dry and gets warm some of the grease will melt and lubricate it, and it will cool and the grease will cease to flow until started by heat again, and so on, whereby a charge will be very lasting.

It will be seen that my improvements for ready interchange of wheels afford most ready means of utilizing ice detachers when wanted, and the lubricating appliance affords effective and indefinite lubrication which is very essential for trolley wheels which are not easy of access and soon run dry and wear rapidly when dependent upon being oiled from time to time in the common way.

I claim—

1. The combination with a trolley pole, of the wheel housing pivoted in the jaws of the fork of said pole, and interchangeable trolley wheels secured by the detachable pivot confined by the jaws of the fork when in the working position, and being removable from such confinement by turning the housing on its pivot substantially as described.

2. The combination in a trolley of the pole having the fork adapted for the ordinary trolley wheel, the wheel housing pivoted in the jaws of the fork by the ordinary trolley wheel pivot, and the beak resting on the head of the fork, the trolley wheel having the grease chamber, and the detachable trolley pivot confined by the jaws of the fork when in the working position substantially as described.

Signed at New York city, in the county and State of New York, this 27th day of February, A. D. 1895.

THEOPHILE EUPHRAT.

Witnesses:
W. J. MORGAN,
S. H. MORGAN.